United States Patent
Kato (10) Patent No.: US 8,506,093 B2
(45) Date of Patent: Aug. 13, 2013

(54) PROJECTOR, METHOD THAT ADJUSTS LUMINANCE OF PROJECTED IMAGE, AND PROGRAM

(75) Inventor: Takeshi Kato, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 178 days.

(21) Appl. No.: 12/998,468

(22) PCT Filed: Oct. 31, 2008

(86) PCT No.: PCT/JP2008/069934
§ 371 (c)(1),
(2), (4) Date: Apr. 25, 2011

(87) PCT Pub. No.: WO2010/050058
PCT Pub. Date: May 6, 2010

(65) Prior Publication Data
US 2011/0199588 A1    Aug. 18, 2011

(51) Int. Cl.
*G03B 21/14*    (2006.01)

(52) U.S. Cl.
USPC .......... 353/101; 353/31; 353/69; 353/71; 353/85; 353/88; 359/694; 359/696

(58) Field of Classification Search
USPC ........... 353/31, 69, 70, 71, 85, 88, 101, 121, 353/122; 349/5, 7–9; 362/295
See application file for complete search history.

(56) References Cited

U.S. PATENT DOCUMENTS

| | | | |
|---|---|---|---|
| 7,070,284 B2 * | 7/2006 | Tanaka et al. | 353/84 |
| 7,300,160 B2 | 11/2007 | Nakamura | |
| 7,972,005 B2 * | 7/2011 | Jose | 353/28 |
| 2002/0080289 A1 * | 6/2002 | Koyama | 349/5 |
| 2005/0219472 A1 * | 10/2005 | Matsumoto | 353/69 |
| 2006/0170874 A1 * | 8/2006 | Yumiki et al. | 353/42 |
| 2006/0256299 A1 | 11/2006 | Saito | |
| 2006/0285080 A1 * | 12/2006 | Kurihara | 353/70 |

FOREIGN PATENT DOCUMENTS

| | | |
|---|---|---|
| CN | 1604632 A | 4/2005 |
| CN | 1863290 A | 11/2006 |
| JP | 2000-112021 A | 4/2000 |
| JP | 2003-241311 A | 8/2003 |
| JP | 2005-106951 A | 4/2005 |

OTHER PUBLICATIONS

Chinese Office Action dated Mar. 26, 2012, with English translation.

* cited by examiner

*Primary Examiner* — Georgia Y Epps
*Assistant Examiner* — Sultan Chowdhury
(74) *Attorney, Agent, or Firm* — McGinn IP Law Group, PLLC (57) ABSTRACT

A projector that projects an image to a projection object using light emitted from a light source lamp, including a light adjustment sensor that measures the projection distance to the projection object and the intensity of reflected light from the projection object; a zoom position sensor that detects a zoom ratio; and a control section that adjusts the intensity of light emitted from the light source lamp based on the projection distance and the reflected light intensity measured by the adjustment sensor and the zoom ratio detected by the zoom position sensor so as to keep the luminance of a projection image displayed on the projection object constant.

7 Claims, 7 Drawing Sheets

PROJECTOR, METHOD THAT ADJUSTS LUMINANCE OF PROJECTED IMAGE, AND PROGRAM

TECHNICAL FIELD

The present invention relates to a projector that projects an image, a method that adjusts luminance of a projection image, and a program.

BACKGROUND ART

In recent years, cases in which images that are used for a presentation or the like are projected from a projector to a projection object such as a screen and in which they are shared by many people have been increasing.

A projector is a device that displays an image on a projection object by causing light projected from the projector to be diffused and reflected on the projection object. In this case, luminance that is apparent brightness of a projection image displayed on the projection object varies depending on the intensity of light projected from the projector. This intensity ordinarily depends on the output value of a light source lamp with which the projector is provided.

The output intensity of this light source lamp with which each projector is provided ordinarily has been designated like 220 W, 300 W, etc. Thus, the luminance of a projection image largely varies depending on the environment where the projector is used, for example, the projection distance between the projector and the projection object, the zoom ratio, and so forth. For example, the shorter the distance between the projector and the projection object, the higher the luminance of the projection image becomes, whereas the smaller the zoom ratio, the higher the luminance of the projection image becomes.

In this way, there are situations in which the luminance of a projection image varies depending on the environment where the projector is used, resulting in situation in which the luminance of a projection image became excessively high or excessively low.

Thus, there is demand for a technique that allows the luminance of a projection image to become constant regardless of the environment where the projector is used and one related art reference has been disclosed for example in JP 2003-241311A.

In the technique disclosed in JP 2003-241311A, the intensity of light projected from a projector is adjusted depending on the projection distance between the projector and the projection object and a zoom ratio, such that the luminance of the projection image can be prevented from becoming excessively high or excessively low regardless of the environment where the projector is used.

Besides the projection distance and zoom ratio, the luminance of a projection image varies with the reflectance of the projection object.

Since the reflectance of the projection object varies depending on the type and color of the projection object, when the type and color of the projection object are different, the problem in which the luminance of a projection image cannot be kept constant arises.

DISCLOSURE OF THE INVENTION

An object of the present invention is to provide a projector, a method that adjusts the luminance of a projection image, and a program that allows the luminance of the projection image to be kept constant even if the projection distance, zoom ratio, and projection object are different.

To accomplish the foregoing object, the present invention is a projector that projects an image to a projection object using light emitted from a light source lamp, comprising:

a light adjustment sensor that measures a projection distance to the projection object and an intensity of reflected light from the projection object;

a zoom position sensor that detects a zoom ratio; and a control section that adjusts an intensity of light emitted from the light source lamp based on the projection distance and the reflected light intensity measured by the adjustment sensor and the zoom ratio detected by the zoom position sensor so as to keep the luminance of a projection image displayed on the projection object constant.

In addition, the present invention is a method that adjusts a projection image for a projector that projects an image to a projection object using light emitted from a light source lamp, comprising:

a process that measures a projection distance to the projection object and an intensity of reflected light from the projection object;

a process that detects a zoom ratio; and a process that adjusts an intensity of light emitted from the light source lamp based on the projection distance and the reflected light intensity that have been measured and the zoom ratio that has been detected so as to keep the luminance of a projection image displayed on the projection object constant.

In addition, the present invention is a program that causes a projector that projects an image to a projection object using light emitted from a light source lamp to realize functions comprising:

a function that measures a projection distance to the projection object and an intensity of reflected light from the projection object;

a function that detects a zoom ratio; and a function that adjusts an intensity of light emitted from the light source lamp based on the projection distance and the reflected light intensity that have been measured and the zoom ratio that has been detected so as to keep the luminance of a projection image displayed on the projection object constant.

Since the present invention is structured as described above, even if the projection distance, zoom ratio, and projection object are different, the luminance of the projection image can be kept constant.

BEST MODES THAT CARRY OUT THE INVENTION

In the following, with reference to drawings, embodiments of the present invention will be described.

Figure 1:
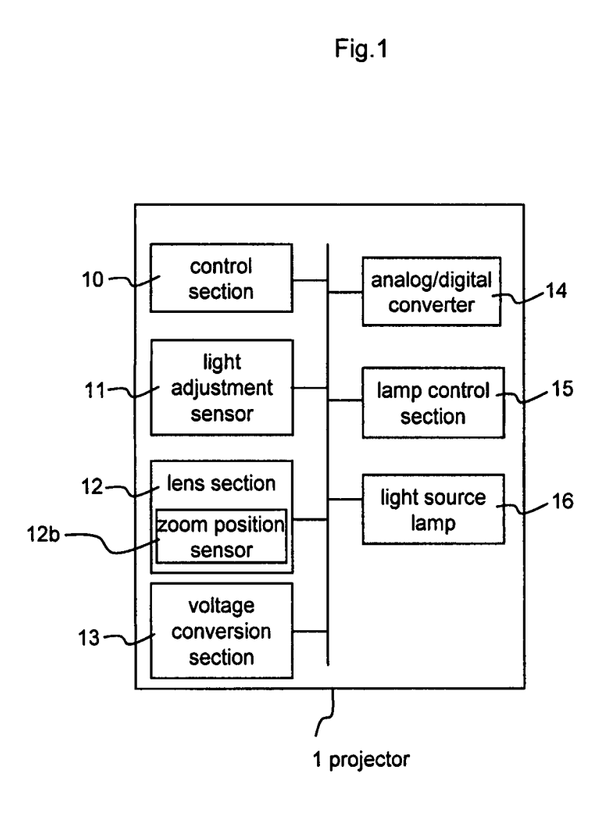
FIG. 1 is a block diagram showing a structure of an embodiment of a projector according to the present invention.

FIG. 1 is a block diagram showing a structure of an embodiment of a projector according to the present invention.

Projector 1 of this embodiment is provided with control section 10, light adjustment sensor 11, lens section 12 having zoom position sensor 12b, voltage conversion section 13, analog/digital converter 14, lamp control section 15, and light source lamp 16.

Projector 1 shown in FIG. 1 causes light projected from projector 1 to be diffused and reflected on a projection object so as to display an image on the projection object.

Figure 2:
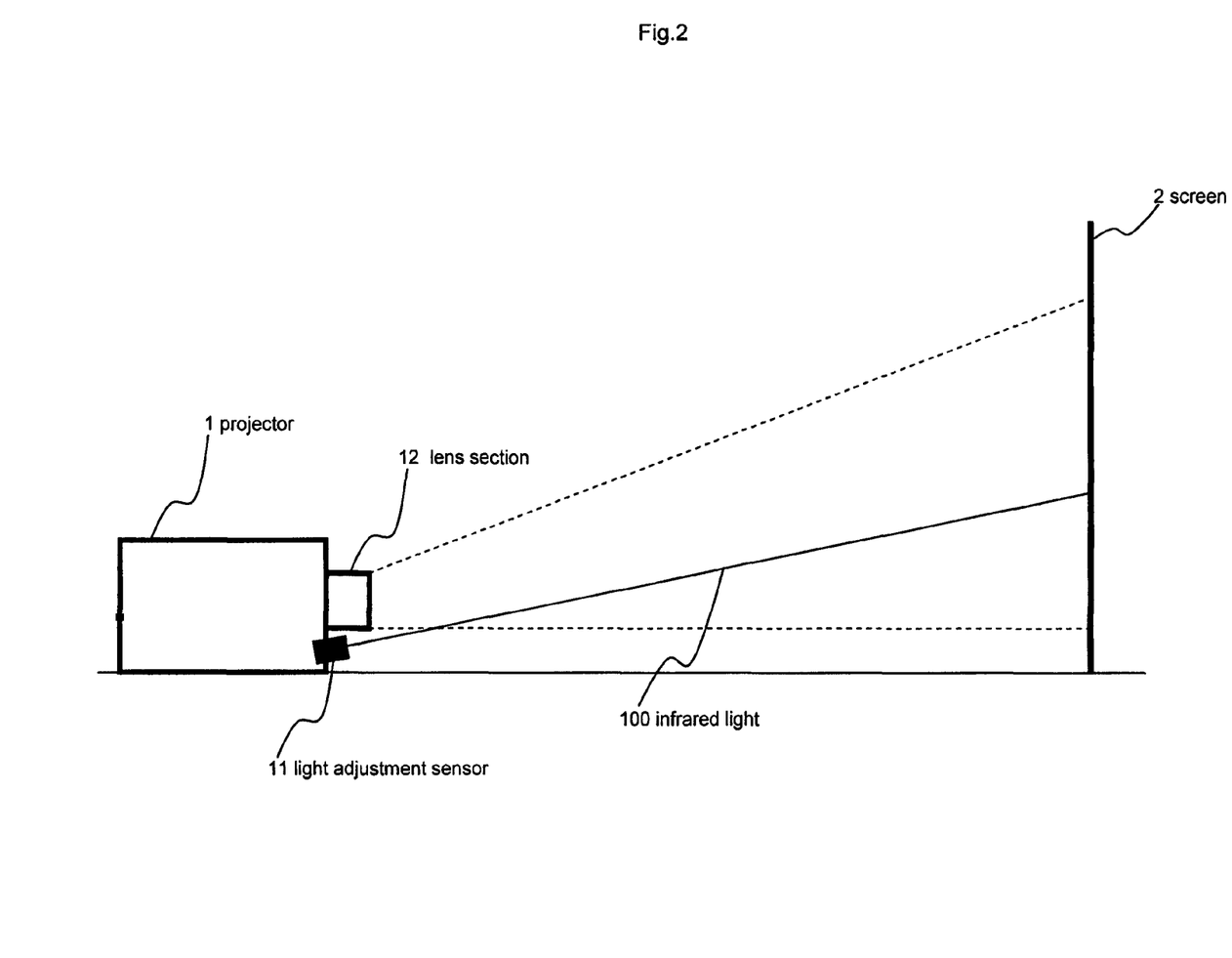
FIG. 2 is a schematic diagram showing the situation in which the projector shown in FIG. 1 projects light.

FIG. 2 is a schematic diagram showing the situation in which projector 1 shown in FIG. 1 projects light.

As shown in FIG. 2, projector 1 shown in FIG. 1 projects light having an intensity according to an output value of light source lamp 16 to screen 2 through lens section 12.

The light projected from projector 1 to screen 2 diffuses and is reflected on screen 2 and reaches the eyes of a person who is watching screen 2. In this case, light projected from projector 1 to screen 2 is not totally reflected by screen 2, but diffused thereby.

On the other hand, light adjustment sensor 11 shown in FIG. 1 is disposed with an angle to screen 2, not right angle thereto and irradiates screen 2 with infrared light 100 so as to measure the projection distance between projector 1 and screen 2, and so forth. Details of the operation of light adjustment sensor 11 will be described later.

In the following, the function of each section of projector 1 shown in FIG. 1 will be described.

Control section 10 compensates the output value of light source lamp 16 in a reference environment using various types of characteristics based on real environmental data that represent a real environment where projector 1 is projecting an image so as to compute the output value of light source lamp 16 in the real environment. Then, control section 10 outputs the output value of light source lamp 16 to lamp control section 15. In this embodiment, the real environmental data are projection distance data that represent the projection distance between projector 1 and screen 2 measured by light adjustment sensor 11, light intensity data that represent the intensity of reflected infrared light that is collection of the diffused light of infrared light 100 that returns from screen 2 to light adjustment sensor 11 by causing light adjustment sensor 11 to irradiate screen 2 with infrared light 100 (see FIG. 2), and zoom ratio data that represent a zoom ratio that zoom position sensor 12b detects. On the other hand, in this embodiment, the reference environment is an environment where a "reference screen" having a particular reflectance returns reflected infrared light having a light intensity according to the reflectance and in which a reference zoom ratio is based on the tele end. In this case, the tele end represents a maximum telescopic state. These various types of characteristics based on which control section 10 computes the output value of light source lamp 16 will be described later with reference to an operational flow chart.

Light adjustment sensor 11 measures the projection distance between projector 1 and screen 2 and the intensity of the reflected infrared light based on the infrared LED (Light Emitting Diode)–PSD (Position Sensitive Device) system.

Then, light adjustment sensor 11 outputs projection distance data that represent the measured projection distance to analog/digital converter 14 and a current value that represents the intensity of the measured reflected infrared light to voltage conversion section 13. This current value will be described later.

In the following, the method in which light adjustment sensor 11 shown in FIG. 1 and FIG. 2 measures the projection distance between projector 1 and screen 2 and the intensity of the reflected infrared light will be described.

First of all, the method in which light adjustment sensor 11 shown in FIG. 1 and FIG. 2 measures the projection distance between projector 1 and screen 2 will be described.

Figure 3:
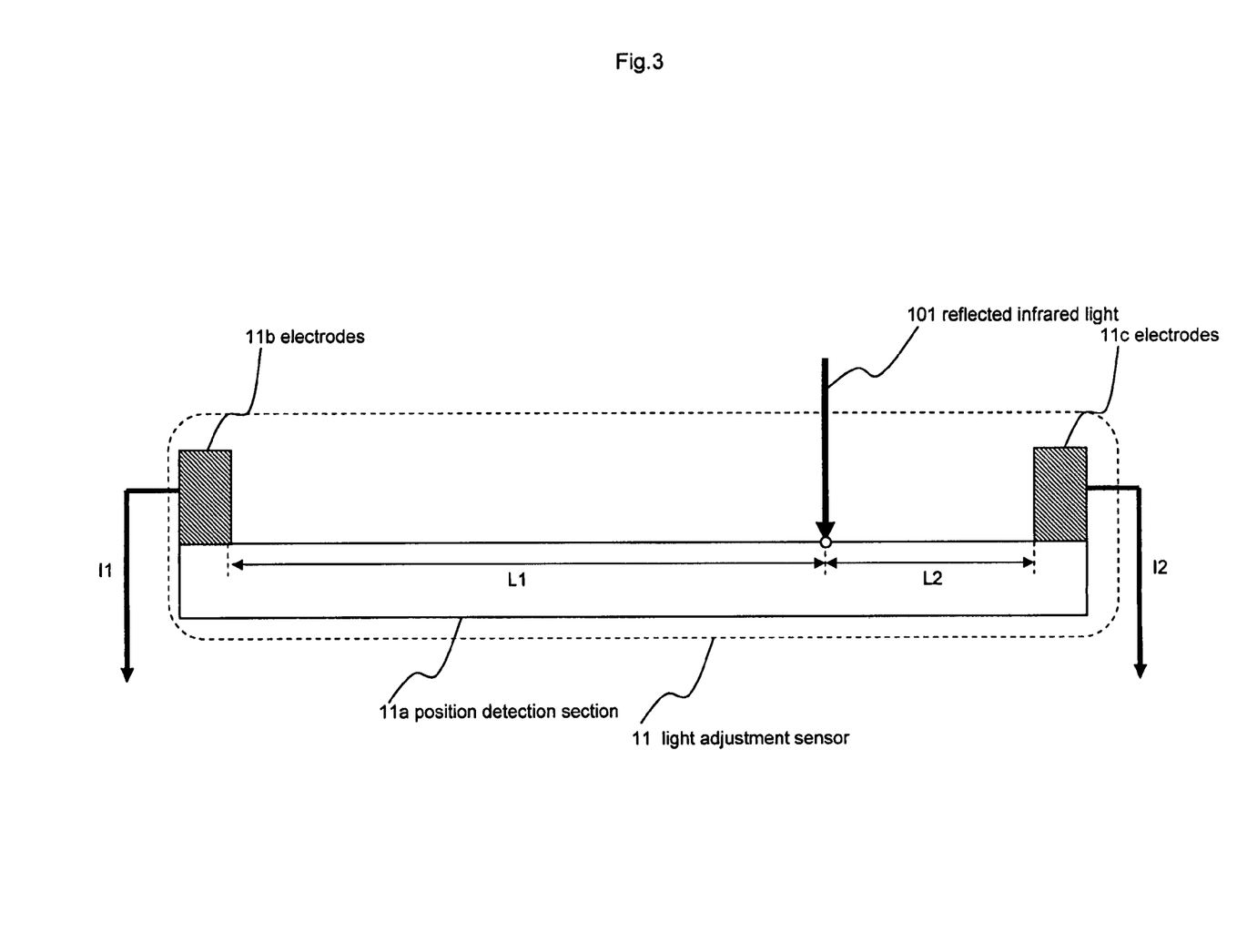
FIG. 3 is a schematic diagram that describes an operation in which a light adjustment sensor shown in FIG. 1 and FIG. 2 measures the projection distance between the projector and a screen.

FIG. 3 is a schematic diagram that describes an operation in which light adjustment sensor 11 shown in FIG. 1 and FIG. 2 measures the projection distance between projector 1 and screen 2.

As shown in FIG. 3, light adjustment sensor 11 shown in FIG. 1 and FIG. 2 is provided with position detection section 11a and electrodes 11b, 11c.

As shown in FIG. 3, light adjustment sensor 11 irradiates screen 2 with infrared light 100 (see FIG. 2) and position detection section 11a receives reflected infrared light that is collection of diffused light of infrared light 100 that returns from screen 2 to light adjustment sensor 11. The projection distance between projector 1 and screen 2 is measured based on the position of position detection section 11a at which reflected infrared light 101 is received.

In FIG. 3, it is assumed that the distance between the position at which reflected infrared light 101 is received and electrode 11b is L1 and the distance between the position at which reflected infrared light 101 is received and electrode 11c is L2. At this point, a current I1 according to the distance L1 is obtained from electrode 11b, whereas a current I2 according to the distance L2 is obtained from electrode 11c. In this case, the relationship between distances L1, L2 and currents I1, I2 is expressed by "L1:L2=I2:I1." With the relationship of "L1:L2=I2:I1," the ratio of currents (I1/I2) is obtained and thereby the ratio of the distance L1 and the distance L2 can be computed. Thus, the projection distance between projector 1 and screen 2 can be computed based on the ratio of the distance L1 and the distance L2.

Since light adjustment sensor 11 measures the projection distance between projector 1 and screen 2 based on the ratio of the currents (I1/I2) obtained from electrodes 11b, 11c according to the position on position detection section 11a at which reflected infrared light 101 is received, the distance can be measured regardless of the intensity of reflected infrared light 101 that returns from screen 2.

Next, a method in which light adjustment sensor 11 shown in FIG. 1 and FIG. 2 measures the intensity of reflected infrared light 101 will be described.

In the infrared LED-PSD system that light adjustment sensor 11 uses, position detection section 11a receives reflected infrared light 101 as a photoelectromotive force so as to obtain the current I1 and the current I2. Thus, the photoelectromotive force also varies with the intensity of reflected infrared light 101. In other words, the sum of the current I1 and current I2 shown in FIG. 3 represents the intensity of reflected infrared light 101 that returns to light adjustment sensor 102.

Figure 4:
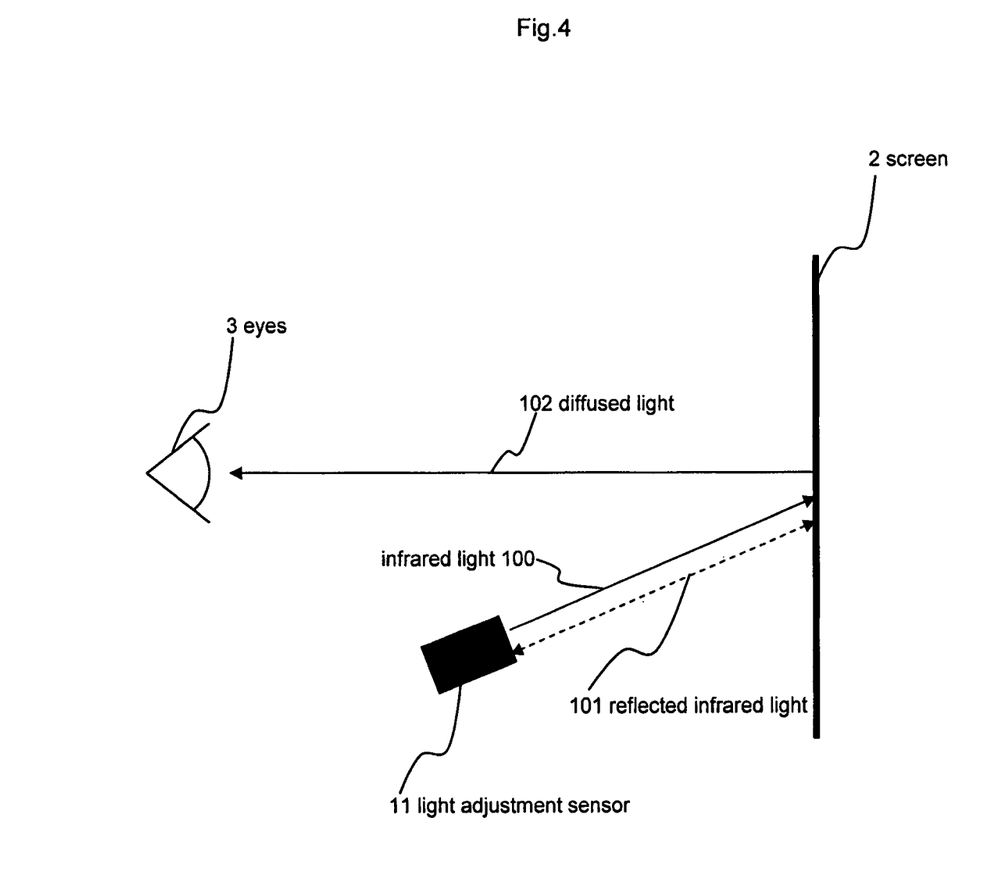
FIG. 4 is a schematic diagram that describes a relationship between the intensity of reflected infrared light that returns to the light adjustment sensor shown in FIG. 1 and FIG. 2 and a luminance of a projection image projected on the screen.

FIG. 4 is a schematic diagram that describes the relationship between the intensity of the reflected infrared light that returns to light adjustment sensor 11 shown in FIG. 1 and FIG. 2 and the luminance of the projection image projected to screen 2.

There is a correlation between the intensity of reflected infrared light 101 that returns to light adjustment sensor 11 shown in FIG. 4 and the luminance of a projection image about which a person who is watching screen 2 feels. Specifically, if the intensity of reflected infrared light 101 that returns to light adjustment sensor 11 is "large," it denotes that the reflectance of diffused light 102 of screen 2 is "high" and the projection image projected on screen 2 appears "bright" in eyes 3 of the person who is watching screen 2. In other words, the luminance of the projection image becomes high.

In contrast, if the intensity of reflected infrared light 101 that returns to light adjustment sensor 11 is "small," it denotes that the reflectance of diffused light 102 of screen 2 is "low" and the projection image projected on screen 2 appears "dark" in eyes 3 of the person who is watching screen 2. In other words, the luminance of the projection image becomes low.

Lens section 12 projects light emitted by light source lamp 16 according to the zoom ratio to screen 2.

Figure 5:
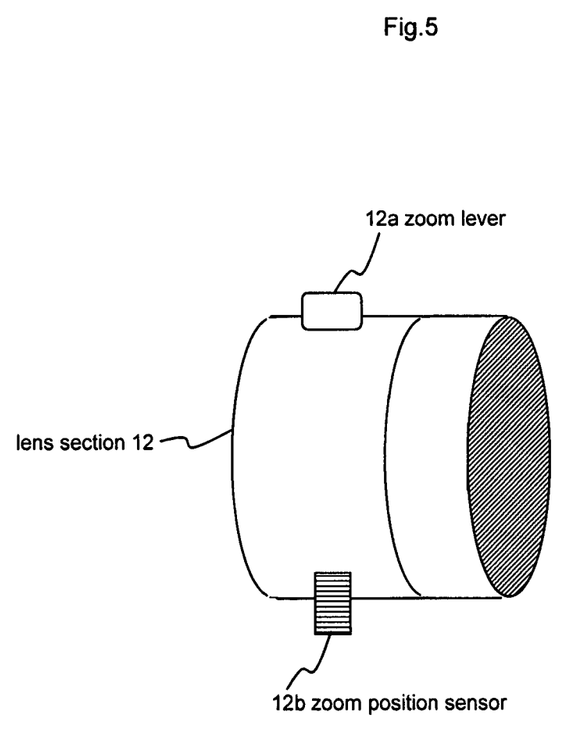
FIG. 5 is a schematic diagram showing a structure of a lens section shown in FIG. 1.

FIG. 5 is a schematic diagram showing a structure of lens section 12 shown in FIG. 1.

Lens section 12 shown in FIG. 1 is provided with zoom lever 12a and zoom position sensor 12b as shown in FIG. 4.

Zoom lever 12a is used by the user of projector 1 to set the zoom ratio.

Zoom position sensor 12b detects the zoom ratio that the user has set by operating zoom lever 12a and outputs zoom ratio data that represent the detected zoom ratio to analog/digital converter 14.

Voltage conversion section 13 converts the sum of currents that are outputted from light adjustment sensor 11 into a voltage value and then outputs it to analog/digital converter 14.

Analog/digital converter 14 converts the projection distance data that are outputted from light adjustment sensor 11, the zoom ratio data that are outputted from zoom position sensor 12b, and the voltage value that is outputted from voltage conversion section 13 into digital data and then outputs them to control section 10.

Lamp control section 15 drives light source lamp 16 according to an output value of light source lamp 16 that is outputted from control section 10.

Light source lamp 16 is driven to emit light according to a command issued from lamp control section 15.

In the following, an operation in which projector 1 having the foregoing situation controls the output value of light source lamp 16 will be described.

Figure 6:
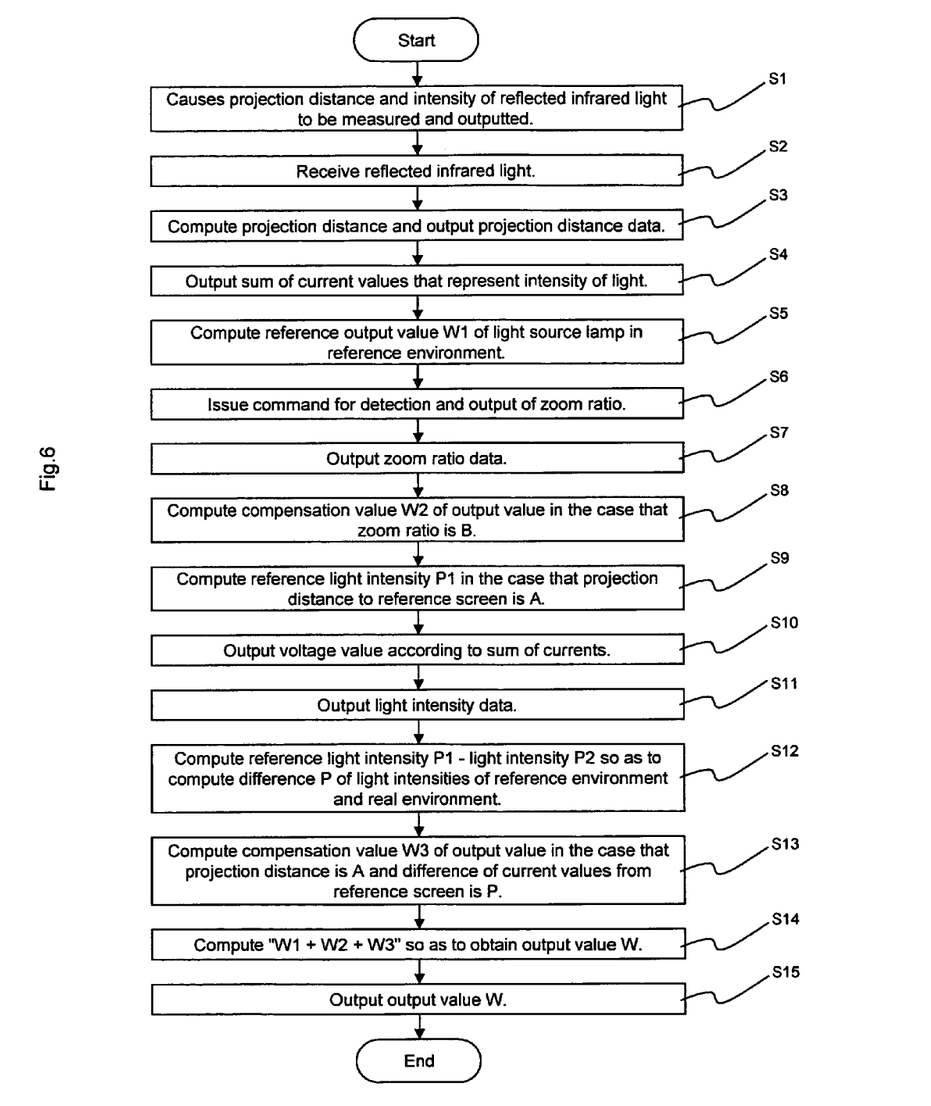
FIG. 6 is a flow chart that describes an operation in which the projector shown in FIG. 1 to FIG. 5 controls the output value of a light source lamp.

FIG. 6 is a flow chart that describes an operation in which projector 1 shown in FIG. 1 to FIG. 5 controls the output value of light source lamp 16.

Control section 10 commands light adjustment sensor 11 to compute the projection distance between projector 1 and screen 2 and measure and output the intensity of reflected infrared light 101 (see FIG. 3 and FIG. 4) (at step S1).

When light adjustment sensor 11 is commanded by control section 10 to measure the projection distance and the intensity of reflected infrared light 101, light adjustment sensor 11 irradiates screen 2 with infrared light 100 (see FIG. 2 and FIG. 4) and then position detection section 11a (see FIG. 3) receives reflected infrared light 101 that is collection of the diffused light of infrared light 100 that returns from screen 2 to light adjustment sensor 11 (at step S2).

Thereafter, light adjustment sensor 11 computes the projection distance between projector 1 and screen 2 based on the current values obtained from electrode 11b (see FIG. 3) and electrode 11c according to the position on position detection section 11a at which reflected infrared light 101 is received.

Then, light adjustment sensor 11 outputs the projection distance data that represent the computed projection distance to analog/digital converter 14 (at step S3). In this case, it is assumed that the computed projection distance is A.

In addition, light adjustment sensor 11 outputs the sum of currents obtained from electrode 11b and electrode 11c according to the position on position detection section 11a at which reflected infrared light 101 is received to voltage conversion section 13 (at step S4).

When analog/digital converter 14 receives the projection distance data from light adjustment sensor 11, analog/digital converter 14 converts the projection distance data into digital data and outputs the converted projection distance data to control section 10.

Figure 7:
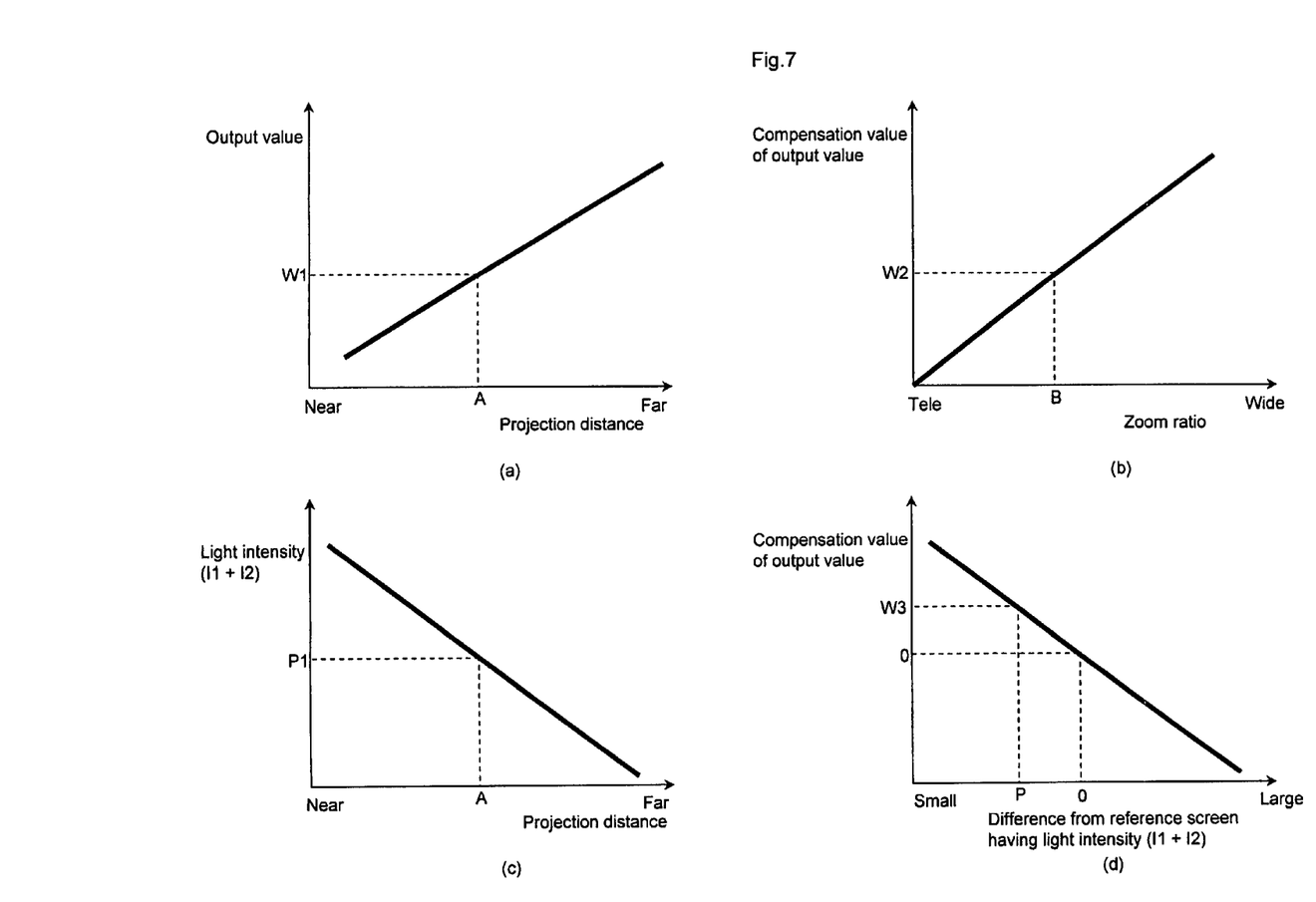
FIG. 7 is graphs showing various types of characteristics with which a control section shown in FIG. 1 computes an output value of the light source lamp.

In this part, various types of characteristics based on which control section 10 computes the output value of light source lamp 16 will be described.

FIG. 7 are graphs showing various types of characteristics based on which control section 10 shown in FIG. 1 computes the output value of light source lamp 16: (a) is a graph showing a relationship between a projection distance in a reference environment and an output value of light source lamp 16 that allows a luminance of a projection image to be kept constant according to the projection distance; (b) is a graph showing a relationship between a zoom ratio and a compensation value of an output value of light source lamp 16 that allows a luminance of the projection image to be kept constant according to a size of difference from a reference zoom ratio; (c) is a graph showing a relationship between a projection distance in which a reference screen is a projection object and an intensity of reflected infrared light 101 according to the projection distance; and (d) is a graph showing a relationship between the difference between an intensity of reflected infrared light 101 on a screen in a real environment and that on a reference screen and a compensation value of an output value of light source lamp 16 that allows a luminance of a projection image to be kept constant according to a size of the difference between the intensities of the lights.

In FIG. 7 (b), the origin is the reference zoom ratio at the tele end. Moreover, in FIG. 7 (b), the compensation value of the output value is an increased value of the output value of light source lamp 16 so as to compensate for a decrease of the luminance of the projection image when the projection image is displayed large on screen 2.

On the other hand, when "difference from reference screen having intensity of light (I1+I2)" on the horizontal axis of the graph is 0 in FIG. 7 (d), since this situation represents the reference screen and since it is not necessary to compensate for the output value of light source lamp 16, the compensation value of the output value on the vertical axis of the graph becomes 0.

When control section 10 receives the projection distance data that are outputted from analog/digital converter 14, control section 10 computes the reference output value that is the output value of light source lamp 16 in the reference environment where the projection distance is A based on the relationship between the projection distance in the reference environment and the output value of light source lamp 16 that allows the luminance of the projection image to be kept constant according to the projection distance (at step S5). In this example, as shown in FIG. 7 (a), it is assumed that the computed reference output value is W1.

Thereafter, control section 10 commands zoom position sensor 12b to detect the present zoom ratio and output the detected zoom ratio to analog/digital converter 14 (at step S6).

When zoom position sensor 12b is commanded by control section 10 to output the zoom ratio, zoom position sensor 12b outputs the zoom ratio data that represent the present zoom ratio to analog/digital converter 14 (at step S7). In this case, it is assumed that the detected zoom ratio is B.

When analog/digital converter 14 receives the zoom ratio data from zoom ratio position sensor 12, analog/digital converter 14 converts the zoom ratio data into digital data and outputs the converted zoom ratio data to control section 10.

When control section 10 receives the zoom ratio data from analog/digital converter 14, control section 10 computes a first compensation output value that is the compensation value of the output value of light source lamp 16 in which the zoom ratio is B based on the relationship between the zoom ratio shown in the graph of FIG. 7 (b) and the compensation value of the output value of light source lamp 16 that allows the luminance of the projection image to be kept constant according to the size of the difference from the reference zoom ratio (at step S8). As shown in FIG. 7 (b), it is assumed that the computed first compensation output value is W2.

Then, control section 10 computes a reference reflected light intensity that is the intensity of reflected infrared light 101 in which the distance between projector 1 and the reference screen is A based on the relationship between the projection distance in which the reference screen shown in the graph of FIG. 7 (c) is a projection object and the intensity of reflected infrared light 101 according to the projection distance (at step S9). As shown in FIG. 7 (c), it is assumed that the computed reference reflected light intensity is P1.

When voltage conversion section 13 receives the sum of currents from light adjustment sensor 11 at step S4, voltage conversion section 13 converts the sum of currents into a voltage value and outputs the converted voltage value to analog/digital converter 14 (at step S10).

When analog/digital converter 14 receives the voltage value from voltage conversion section 13, analog/digital converter 14 converts the voltage value into digital data and outputs the converted digital data as light intensity data to control section 10 (at step S11). It is assumed that the light intensity that this light intensity data represent is P2.

Then, control section 10 computes "P1–P2" based on the reference light intensity P1 computed at step S9 and the light intensity P2 that is outputted at step S11 so as to compute the difference between the intensity of reflected infrared light 101 of the reference screen and that of screen 2 (at step S12). It is assumed that the computed difference of intensities of lights is P.

Then, control section 10 computes a second compensation output value that is the compensation value of the output value in which the projection distance is A and the difference between the intensity of reflected infrared light 101 of the screen in the real environment and that of screen 2 is P based on the relationship between the difference, between the intensity of reflected infrared light 101 of the screen in the real environment and that of the reference screen, and the compensation value of the output value of light source lamp 16 that allows the luminance of the projection image to be kept constant according to the difference between the intensities of the lights (at step S13). As shown in FIG. 7 (d), it is assumed that the second compensation output value is W3.

Then, control section 10 computes "W1+W2+W3" based on the reference output value W1 computed at step S5, the first compensation output value W2 computed at step S8, and the second compensation output value W3 computed at step S13. This computation allows the output value of light source lamp 16 in the real environment to be obtained (at step S14). It is assumed that this computed output value is W.

Then, control section 10 outputs the output value W computed at step S14 to lamp control section 15 (at step S15).

When lamp control section 15 receives the output value W from control section 10, lamp control section 15 causes light source lamp 16 to emit light according to the output value W.

In this embodiment, since the output value of the light source lamp is decided in consideration of the difference of reflectances of the projection objects as well as the difference of projection distances and zoom ratios, the luminance of a projection image can be kept constant even if there is a difference not only in the projection distances and zoom ratios, but also in the projection objects.

In this embodiment, an auto focus function using a light adjustment sensor can be structured. A projector that has been equipped with an auto focus function can be provided with the function of this embodiment without incurring any extra cost.

Moreover, in the foregoing embodiment, by controlling the output value of the light source lamp (the brightness of the light source), the luminance of a projection image can be changed; however, the luminance of a projection image can be controlled by other than the output value of the light source lamp. For example, by controlling the aperture in the optical path or by controlling electrical brightness and contrast, the luminance of the projection image can be changed.

As a factor that affects the luminance of a projection image, there is also a surrounding luminous intensity (influence of external light). If the luminance of a projection image is adjusted in consideration of the surrounding luminous intensity, a luminous intensity sensor that can detect the surrounding luminous intensity is mounted on projector 1 and the output value of light source lamp 16 or the like is controlled in the same manner as in the foregoing embodiment. Thus, the luminance of a projection image can be kept constant without depending on the surrounding luminous intensity.

In this embodiment, the process in the projector can be accomplished not only by the above-described dedicated hardware, but also by recording a program, that realizes the function, to a record medium from which the projector can read, causing the projector to read the program from the record medium, and causing the projector to execute the program. Examples of record mediums from which can be read by the projector are movable record mediums such as floppy disk, magneto-optical disc, DVD, and CD, HDD built in the projector, and so forth.

Now, the present invention has been described with reference to the embodiments. However, it should be understood by those skilled in the art that the structure and details of the present invention may be changed in various manners without departing from the scope of the present invention.

The invention claimed is:

1. A projector that projects an image to a projection object using light emitted from a light source lamp, comprising:
   a light adjustment sensor that measures a projection distance to said projection object and an intensity of reflected light from said projection object;
   a zoom position sensor that detects a zoom ratio; and
   a control section that adjusts an intensity of light emitted from said light source lamp based on the projection distance and the difference between the intensity of the reflected light measured by said adjustment sensor and a reference intensity in which a reference screen is a projection object and the zoom ratio detected by said zoom position sensor so as to keep the luminance of a projection image displayed on said projection object constant.

2. The projector as set forth in claim 1, wherein said control section controls an output value of said light source lamp.

3. The projector as set forth in claim 2, wherein said control section causes a value in which a reference output value that controls the output value of said light source lamp and that allows a luminance of said projection image to be kept constant in a reference environment, the control section compensating its value at which the output value of said light source lamp is controlled based on said measured projection distance, said measured reflected light intensity, and said detected zoom ratio, to thereby control the output value of said light source lamp.

4. The projector as set forth in claim 3, wherein said control section computes a reference output value that is an output value of said light source lamp according to said measured projection distance based on a relationship between a projection distance for which an image is projected to a reference projection object at a reference zoom ratio based on which the output value of said light source lamp is controlled and the output value of said light source lamp that allows a luminance of said projection image to be kept constant according to the projection distance, computes a first compensation output value that is a compensation value of an output value of said light source lamp at said detected zoom ratio based on a relationship between the difference, between said reference zoom ratio and said detected zoom ratio, and a compensation value of an output value of said light source lamp that allows a luminance of said projection image to be kept constant according to a size of the difference, computes a reference reflected light intensity that is said reflected light intensity for said measured projection distance based on a relationship between a projection distance to said reference projection object and said reflected light intensity according to the projection distance, computes a second compensation output value that is a compensation value of an output value of said light source lamp according to said measured reflected light intensity based on a relationship between the difference, between said reference reflected light intensity and said measured reflected light intensity, and a compensation value of an output value of said light source lamp that allows a luminance of said projection image to be kept constant according to a size of the difference, and causes a value in which said reference output value is compensated for by said first compensation output value and said second compensation output value to be an output value of said light source lamp.

5. The projector as set forth in claim 1, wherein said light adjustment sensor irradiates said projection object with infrared light and receives reflected light of the irradiated infrared light so as to measure said projection distance and said reflected light intensity.

6. A method that adjusts a projection image for a projector that projects an image to a projection object using light emitted from a light source lamp, comprising:

a process that measures a projection distance to said projection object and an intensity of reflected light from said projection object;

a process that detects a zoom ratio; and a process that adjusts an intensity of light emitted from said light source lamp based on the projection distance and the difference between the intensity of the reflected light that have been measured and a reference intensity in which a reference screen is a projection object and the zoom ratio that has been detected so as to keep the luminance of a projection image displayed on said projection object constant.

7. A non-transitory computer readable recording medium in which a program is recorded, said program that causes a projector that projects an image to a projection object using light emitted from a light source lamp to realize functions comprising:

a function that measures a projection distance to said projection object and an intensity of reflected light from said projection object;

a function that detects a zoom ratio; and a function that adjusts an intensity of light emitted from said light source lamp based on the projection distance and the difference between the intensity of the reflected light that have been measured and a reference intensity in which a reference screen is a projection object and the zoom ratio that has been detected so as to keep the luminance of a projection image displayed on said projection object constant.

* * * * *